Patented June 24, 1930

1,768,074

UNITED STATES PATENT OFFICE

EBEN W. KING, OF EAST CHATHAM, NEW YORK

FILLER

No Drawing.   Application filed January 9, 1928.   Serial No. 245,638.

The invention aims to provide a new and improved filler for cloth, leather, wood, enamel, paint, etc., of such nature that upon drying, it may be given a high polish by rubbing.

The filler embodies a mineral base of aluminum magnesium silicate, the amounts of alumina, magnesia and silica varying considerably without detriment to the filler.

The mineral base is found in three forms—massive, shale-like and crystalline. The massive form is a shale-like mass cemented by oxide of manganese, forming a dark gray mass. The shale-like form is a talc-like shale with less manganese. The crystalline form is somewhat harder and usually resembles trap rock. Chemically, the three forms are practically identical and in making the improved filler, any one or a mixture of two or all, will produce practically the same results.

In compounding the filler, I use this aluminum magnesium silicate ground to a flour-like powder in a suitable mill, add water to this powder and stir thoroughly, add turpentine, stirring or otherwise agitating the mixture until it forms a thick creamy paste, and then add oil or a mixture of oils, again thoroughly agitating or churning the mixture. This gives me a heavy filler suitable for some purposes. A light filler may be made from this heavy filler by thinning it with water, turpentine and oil or a mixture of oils. Medium filler may be made by adding any of the greases—animal, mineral, etc.—to the light filler, giving it a semi-pasty consistency which is preferable for a number of uses and may be advantageously marketed in tubes or jars. This pasty form of the filler answers the purpose of the light filler also when a transparent flexible surface is required. In this connection, it may be stated that the heavy filler is opaque.

With regard to the oil or combination of oils above referred to, it may be explained that about sixty-five per cent to seventy-five per cent of linseed oil (this being drying oil) is used, mixed with twenty-five to thirty-five per cent of castor oil or a good grade of mineral oil (this being non-drying oil). Any good oil, whether mineral, vegetable or animal, can be advantageously used with the linseed oil in about the proportions given, the object of using these oils with the linseed oil, being for softening the filler, that is, making it less hard and brittle. The proportions of oils can vary ten or fifteen per cent and still give good results. Any of the animal, vegetable or mineral greases can be used with the thin or lighter filler for thickening it when a paste form is required, and the amount of turpentine can vary in about the same proportions as the oils and still give good results. Also the amount of water can vary in about the same manner and still be satisfactory.

I have found that about the best results are obtained when using the ingredients in the following proportions:—

Aluminum magnesium silicate—20% to 25%.
Water—20% to 25%.
Turpentine—20% to 25%.
Oils—from 20% to 25%.

Usually, the oils are mixed in about the proportions of three-fourths linseed oil and one-fourth of any oil or oils mentioned as a softener.

About twenty per cent to twenty-five per cent of greases such as those above named, are used when the light filler is to be converted into paste or semi-paste form, and as above mentioned, the ingredients may vary to quite an extent either way and still give good results.

As above stated, the aluminum magnesium silicate forms the mineral base of the filler. The water is a thinner and carrier; the turpentine is a dissolver catalyzer or spreader which uniting with the mineral base forms a coating around the small grains which are separated by the water and holds them in suspension with the same after thoroughly agitating, thus giving the oils a chance to unite perfectly with the mineral base; and these oils or the greases or both, are instrumental in permitting high polishing of the filler when dry.

The aluminum magnesium silicate forming the mineral base of the filler, is preferably of amphibole nature.

The filler may be applied with a brush, rag or sponge, etc., or used as a dip. It thoroughly penetrates and fills all pores and the like, coating all fibres and then hardens, sealing them from all contact with the air and moisture, thereby protecting them or becoming more or less of a rejuvenator, as the case may be. For filling leather by the manufacturer of leather products or for renewing leather, the filler is of great advantage. Also in the manufacture of artificial leather, any suitable material, such as fabric, felt, etc., may be filled with the filler to produce excellent results. As a filler for wood, the present invention is excellent. Regardless of the particular base to which the composition is applied, brisk rubbing of the filler after it dries and hardens, gives a bright lustrous finish.

Besides having filling and polishing qualities of exceptional value and uniting so perfectly with the other ingredients herein defined, the aluminum magnesium silicate has great cutting qualities when used as an abrasive for exceptionally fine work. Certain components have the right degree of hardness for producing a very fine edge on razors and all fine cutting instruments, and the filler made with this mineral base is unexcelled as a dressing for razor strops and the like.

I claim:

1. A filler composition comprising aluminum magnesium silicate reduced to a fine smooth powder, a large amount of drying oil, a much smaller amount of a non-drying oil, water and turpentine, all mixed together in such proportions as to form a creamy mass of homogeneous appearance.

2. A filler composition comprising aluminum magnesium silicate reduced to a fine smooth powder, a large amount of drying oil, a much smaller amount of a non-drying oil, water and turpentine, all mixed together in about equal proportions, constituting a creamy mass of homogeneous appearance.

In testimony whereof I have hereunto affixed my signature.

EBEN W. KING.